Sept. 4, 1923.

H. M. MILLER

PEELING MACHINE.

Original Filed April 10, 1922   3 Sheets-Sheet 1

1,466,799

Inventor
HARRY M. MILLER
Lyon & Lyon
Attorneys

Sept. 4, 1923.
H. M. MILLER
PEELING MACHINE
Original Filed April 10, 1922   3 Sheets-Sheet 2
1,466,799
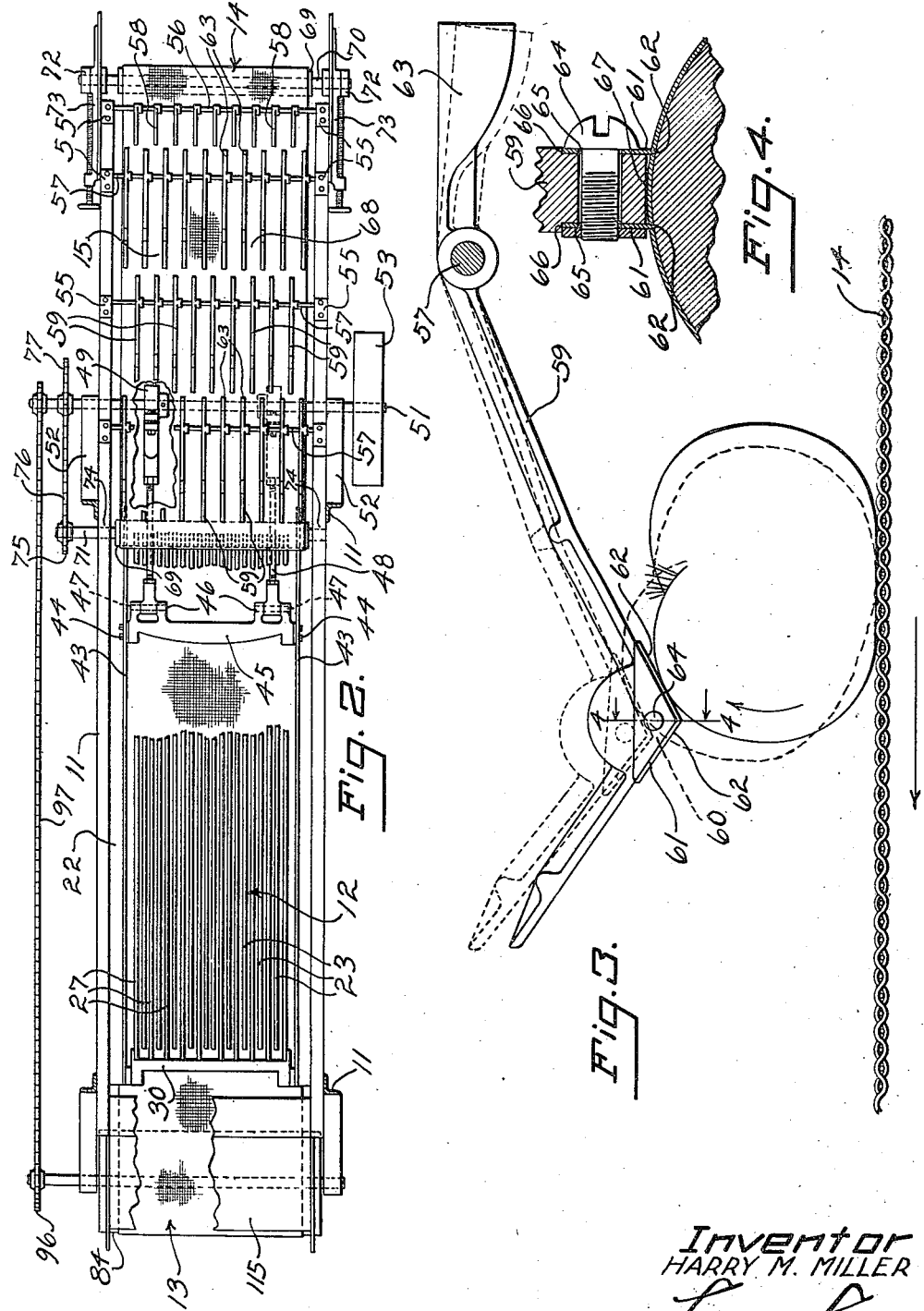
Inventor
HARRY M. MILLER
Lyon & Lyon
Attorneys Sept. 4, 1923.
H. M. MILLER
PEELING MACHINE
Original Filed April 10, 1922    3 Sheets-Sheet 3
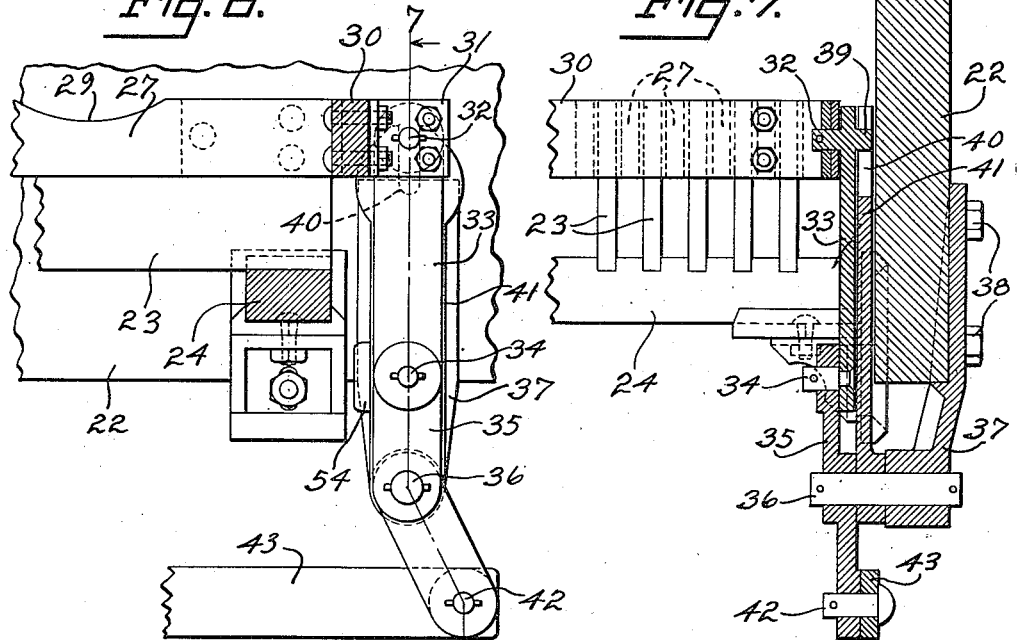
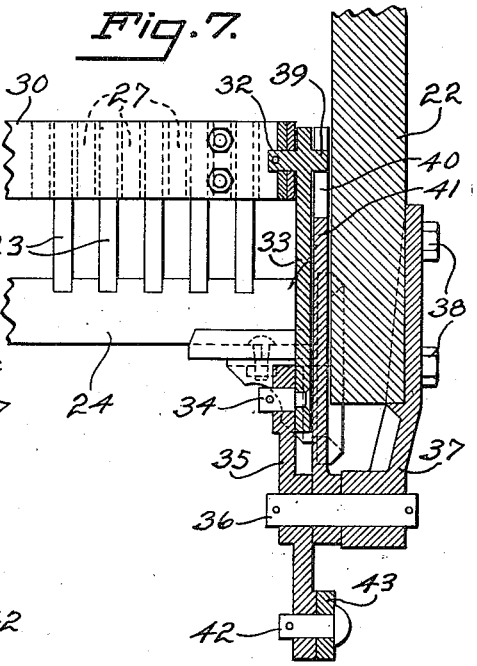
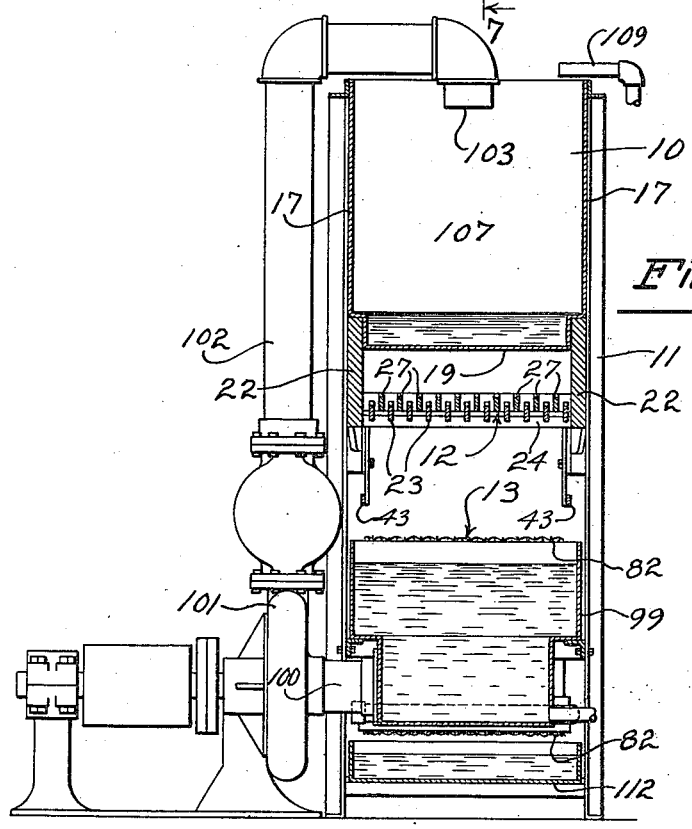
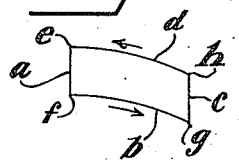
Inventor
HARRY M. MILLER
Lyon & Lyon
Attorneys Patented Sept. 4, 1923.

1,466,799

UNITED STATES PATENT OFFICE.

HARRY M. MILLER, OF SOUTH PASADENA, CALIFORNIA, ASSIGNOR TO NATIONAL PEELING MACHINE COMPANY, OF LOS ANGELES, CALIFORNIA, A CORPORATION OF CALIFORNIA.

PEELING MACHINE.

Application filed April 10, 1922, Serial No. 551,259. Renewed July 9, 1923.

*To all whom it may concern:*

Be it known that I, HARRY M. MILLER, a citizen of the United States, residing at South Pasadena, in the county of Los Angeles and State of California, have invented a new and useful Peeling Machine, of which the following is a specification.

This invention relates to a machine for peeling fruits and vegetables. The machine effects the operations of producing openings in the skins and causing water to enter the openings to wash the skins from the pulp bodies.

An object of the invention is to maximize the output of a machine of a given size. To accomplish this the fruit or vegetables are conveyed beneath a plurality of knives which function to slit the skins and also turn the fruit or vegetables so that the next succeeding knife engaging the skin will cut the skin in a different place.

Another object is to simplify the construction.

The accompanying drawings illustrate the invention:

Fig. 2 is a plan section on the line indicated by 2—2, Fig. 1. A portion of one of the conveyor aprons is broken away immediately over one of the eccentrics.

Fig. 3 is an enlarged detail showing one of the fingers and its knives and a fragment of the conveyor belt. Different positions of the finger are indicated in solid and dotted lines and a tomato is also indicated in two different positions in solid and dotted lines.

Fig. 4 is an enlarged fragmental section on the line indicated by 4—4, Figure 3.

Fig. 5 is an end elevation mainly in section on the line indicated by 4—4, Fig. 1.

Fig. 6 is an enlarged detail of a portion of the conveyor operating mechanism.

Fig. 7 is an elevation mainly in section on the irregular line indicated by 7—7, Fig. 6.

Fig. 8 is a diagrammatic view illustrating the path of movement of any point on any one of the conveyor strips.

Figure 1:
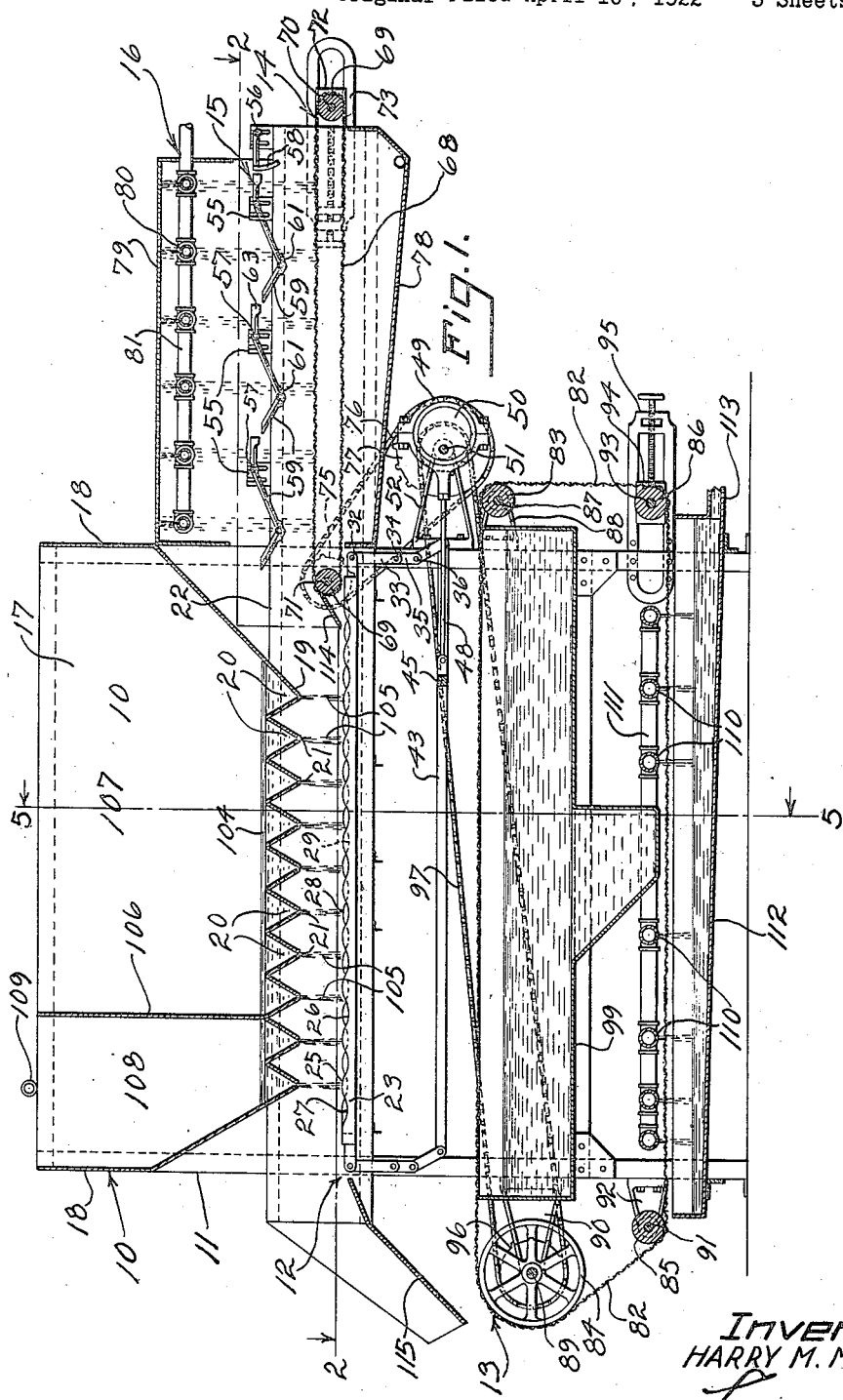
Figure 1 is a longitudinal section of a peeling machine constructed in accordance with the provisions of this invention.

Referring to the drawings, there are provided a water-distributing container 10 supported by a frame 11, a conveyor 12 beneath the container 10, a second conveyor 13 beneath the conveyor 12, a conveyor 14 in front of the conveyor 12 and slightly above the level thereof, skin perforating means 15 above the level of the conveyor 14, and water spraying means 16 above the skin perforating means.

The water-distributing container 10 comprises side walls 17, end walls 18 and a channeled bottom 19. The channels are indicated at 20 and extend transversely of the tank and, in this instance are V-shaped. The bottoms of the channels are provided with openings 21 which may be in the form of slots extending the full length of the channels.

The sides of the conveyors 12 and 14 are indicated at 22 and the conveyor 12 is otherwise constructed as follows:

Arranged transversely of the openings 21 and beneath said openings is a series of spaced slats or strips 23 which are mounted at their ends on cross members 24 that are connected at their ends to the side members of the conveyor 12. The upper edges of the slats 23 form alternatively arranged humps and depressions 25, 26, which together produce wave-like or scalloped supporting surfaces. Between each two adjacent slats 23, and spaced therefrom, are movable slats or strips 27. The upper edges of the slats 27 form alternatively arranged humps and depressions 28, 29, so as to produce wave-like or scalloped supporting surfaces similar to the slats 23.

The slats 27 are connected at their opposite ends to transversely extending crossbars 30 that are provided at their ends with bearings 31 in which are journalled pivots 32, projecting from arms 33, respectively. The arms 33 are pivoted at 34 to oscillating levers 35, which in turn are pivoted at 36 to bearings 37 fastened by bolts 38 to the lower margins of the conveyor sides 22. The parts 34 to 37 inclusive, just described, are arranged in pairs, there being a pair connected to each of the cross-bars 30. Each of the arms 33 is provided with a pin 39 and each pin engages a slot 40 in an arm 41. The arms 41 are journaled at their lower ends on the pins 36, respectively, between the levers 35 and bearings 37.

One of each pair of the levers 35 is pivoted at 42 to one end of a connecting rod 43 and the connecting rods are secured by bolts 44 to a cross piece 45 provided with bearings 46 carrying pivots 47. The pivots 47 connect the cross pieces 45 to eccentric rods 48 which are connected to eccentric straps 49 driven by eccentrics 50. The eccentrics 50 are mounted on a power shaft 51 journaled in bearings 52 supported by the frame 11. The shaft 51 may be driven in any suitable manner and, in this instance, is provided with a pulley 53.

The arms 41 are provided with lugs forming stops 54 adapted to be engaged by the lower ends of the arms 33 when the pivots 34, 36 and 39 are substantially in vertical alinement, so that the joint 34 of the toggle devices, formed by the arms 33 and levers 35, cannot break toward the left, but only toward the right to the position shown in Figure 6.

Assuming that the parts of the mechanism just described for moving the slats 27 are in the positions shown in Figure 6, the path of movement described by the pivot 39 and also by any given point on any of the slats 27 is shown diagrammatically in Figure 8 of the drawings, said path of movement consisting of four limbs, a vertical movement downwardly indicated by the line $a$, a downwardly curved longitudinal movement indicated by the line $b$, a vertical upward movement indicated by the line $c$, and an upwardly curved longitudinal movement indicated by the line $d$. In Figure 1 of the drawings the discharge end of the machine is at the left and the intake end at the right, and the direction of motion $b$ is from the discharge end toward the intake end. Also the direction of motion $d$ is from the intake end toward the discharge end. Thus it is clear that the slats 27 in their forward movement will be in their uppermost positions, and that said slats in their rearward motion will be at the lower portion of their movement. Consequently, when the parts are in the positions shown in Figure 6, the bottom of any one of the depressions 29 will be at the point $e$ in Figure 8. When the toggle devices break to the right in Figure 6, said bottom of the depression will be at the point $f$. Also when the connecting rods 43 have been moved to the left end of their stroke, the bottom of the depression will be at the point $g$. At the beginning of the return movement of the connecting rods the bottom of the depression will be at the point $h$. When the bottoms of the depressions are at the point $e$ they will be slightly above the level of the tips of the humps 25, and the centers of the depressions 29 will be slightly to the left of the centers of said humps so that the vegetables or fruit, which may be on the slats 27, will be deposited slightly to the left of the centers of the humps 25 when the slats 27 make the movement $a$, thus allowing the fruit to roll forwardly down the humps 25 into the depressions 26. This rolling movement of the fruit of course turns it so as to expose other portions thereof to water discharging through the openings 21. It is to be noted that the water discharges through the openings 21 in the form of sheets.

The fruit discharges onto the conveyor 12 from the perforating mechanism 15 which will now be described:

Supported in bearings 55 on the frame 11 are transversely extending shafts 56, 57. Loosely mounted on the shaft 56 are fingers 58 which may be in the form of rake teeth, as clearly shown in Figure 1. Loosely mounted on the shaft 57 are fingers 59 of any suitable construction. In the instance shown, the fingers 59 are of angular construction so that when said fingers are in the positions indicated in Figure 3 the bends 60 of the fingers will be at a lower level than the other portions of the fingers. To the bends 60 are secured knives 61 which, in this instance, are triangular in shape with two cutting edges 62 arranged at an angle to each other in the form of a V. The fingers 59 extend rearwardly of the shafts 57 as indicated at 63, said rearwardly extending portions forming counter weights to prevent the knives 61 pressing too hard upon the skins to be cut. It will be noted, by referring to Figure 4, that each finger 59 is provided with a pair of knives, one on each side of said finger and secured in place by a bolt 64 extending through holes 65 in both knives. The knives are preferably inset in recesses 66 in the sides of the fingers 59. The cutting edges 61, 62 project but slightly below the lower face 67 of the fingers 59 so that the knives will just cut through the skins of the fruit or vegetables and not any material distance into the pulp bodies. In Figure 4 the knives are shown in cutting relation to the skin of the fruit which is indicated and it will be noted that the lower face 67 of the finger contacts with the skin of the fruit to limit penetration of the knives into the fruit.

By referring to Figure 2, it will be seen that the fingers 59 are arranged in sets or series and that, in this instance, three sets are shown. The fingers of one set are in staggered relation with those of the adjacent set, and the fingers of the set adjacent the fingers 58 are in staggered relation with said fingers 58. The staggered relation of the knives is effective in efficiently perforating the fruit. It will also be noticed, by referring to Figure 3 of the drawings, that the construction of the fingers and knives described above causes the tomato or other vegetable or fruit being cut to be turned or rolled so that first the knife edge 62 and then the knife edge 61 will cut the skin, thus producing a comparatively long cut as the tomato is rolled by operation of the conveyor 14. The fruit or vegetable is turned over by the first set of fingers 59 as the knives of said fingers cut the skins and, consequently, when said fruit or vegetable reaches the second set of knives 60, said second set will be effective to cut the skin on the opposite side to that cut by the first set of knives. It is to be noted that the fingers 59 drag but lightly upon the fruit or vegetables so as to in no wise injure them, the pressure being just sufficient to cause the knives to cut through the skins and to cause the turning movement of the fruit or vegetable.

The conveyor 14, on which the fruit or vegetables are supported and by which they are moved into engagement with the knives 60, comprises an endless foraminous apron 68 extending around rollers 69 on shafts 70, 71, respectively. The shaft 70 is journaled in bearings 72 of belt tighteners 73 mounted on the conveyor sides 22. The shaft 71 is journaled in bearings 74 in the conveyor sides 22. The shaft 71 is provided with a sprocket wheel 75 which is connected by a sprocket chain 76 to a sprocket wheel 77 mounted on the shaft 51. Beneath the conveyor apron 68 is a receptacle 78, the sides of which are formed by downward extensions of the conveyor sides 22.

Mounted on the conveyor sides 22 above the perforating means 15 is a hood 79 and just beneath the top of the hood are positioned nozzles 80 which are directed to discharge upwardly against the hood so as to break the force of the liquid issuing from the nozzles. The nozzles are supplied with water through piping 81.

The conveyor 13 comprises an endless foraminous apron 82 which runs over rollers 83, 84 and under rollers 85, 86. The roller 83 is mounted on a shaft 87 journaled in bearings 88 mounted on the frame 11. The roller 84 is the driver for the belt 82 and is mounted on a shaft 89 journaled in bearings 90 secured to the frame 11. The roller 85 is mounted on a shaft 91 journaled in bearings 92 secured to the frame 11, and the roller 86 is mounted on a shaft 93 journaled in the adjustable bearings 94 of belt-tighteners indicated in general by the character 95. The belt-tighteners 95, as well as the belt-tighteners 73, are of well known construction and therefore need not be described in detail. On the shaft 89 is mounted a sprocket wheel 96 driven by a sprocket chain 97 which engages a sprocket wheel 98 mounted on the shaft 51.

Directly beneath the upper run of the apron 82 is a receptacle 99 which is connected by a pipe 100 to a pump 101. The pump 101 discharges water from the receptacle 99 through a pipe 102 into the container 10, the discharge end 103 of the pipe 102 extending over the upper edge of one side of the container 10 so as to discharge about midway between the sides of said container. The pump 101 will be driven at such rate of speed as to fill the channels 20 and produce a comparatively thin film 104 above the channels so that the water will be evenly distributed over the bottom of the container 10. The depth of water in the container 10 will preferably be no greater than described in order that the head under which the water discharges through the openings 21 will be as low as possible so that the sheets 105 of water produced by the openings 21 will not assume the character of the well-known peeling jet, the force of which is depended upon in the well known peach peeling machine to forcibly remove the lye-disintegrated peel from the pulp bodies of peaches.

Preferably, the container 10 is provided with a partition 106 extending transversely near the discharge end of the machine from the upper edge of the container to a point between two adjacent channels 20. In this particular instance the partition 106 is positioned to provide two of the channels on the discharge side of the partition. The container 10 is thus divided by the partition into separate compartments 107, 108 and the pipe 102 discharges only into the compartment 107. A fresh water pipe 109 is positioned to discharge into the compartment 108.

Beneath the receptacle 99 and immediately over the lower run of the apron 82 are spray nozzles 110 supplied with water through piping 111. Beneath the lower run of the apron 82 is positioned a receptacle 112 having a waste pipe connection 113.

The machine described above, though adapted to efficiently peel various fruits and vegetables, is especially useful in the peeling of tomatoes which cannot be successfully peeled in the well-known peach-peeling machine. In order to successfully peel tomatoes it is necessary to perforate or make openings in the skins and to then cause comparatively large volumes of water under comparatively low head to come in contact with the skins so that the water will enter the openings and flush the skins from the pulp bodies. The tomatoes will of course first be treated with a skin-loosening agent to loosen the skins from the pulp bodies.

To peel tomatoes by the machine, the tomatoes will be fed to the apron 68 in any suitable manner and the fingers 58 will operate to distribute the tomatoes evenly the full width of the apron and prevent piling up of the tomatoes on one another. The apron 68 operates to carry the tomatoes into engagement with the knives 60 so as to effect perforating of the skins and turning of the tomatoes in the manner referred to above. While the perforating and turning operations are being performed the tomatoes are gently sprayed with water from the nozzles 80, the force of the spray being broken by reason of its striking the hood 79 and then falling by gravity alone upon the tomatoes. By the time the tomatoes have reached the discharge end of the apron 68 they have been turned several times and perforated on different sides and the alkali or other agent that has been used for loosening the skins has been rinsed from the tomatoes by the water spray.

The tomatoes then discharge down an inclined chute 114 from the apron 68 onto the conveyor 12 which operates in a manner hereinbefore set forth in detail. As the tomatoes advance and are turned over and over on the conveyor 12, they pass through the sheets 105 of water and said water enters the openings in the skins and expands and tears the skins and flushes them from the pulp bodies. It is to be noted that the sheets 105 of water fall but a comparatively slight distance and thus there is comparatively no head or force to the water. The less the force the better, since the pulp bodies of tomatoes and other coreless vegetables and fruits are very easily injured by jets of water such, for example, as employed in the well known peach-peeling machine.

By the time that the tomatoes have reached a point beneath the partition 106 the skins will have been entirely removed and will be washed through the conveyor 12 and deposited upon the apron 82. As the pulp bodies, thus denuded of their skins, pass through the sheets of water discharging from the compartment 108, said water, being fresh, washes the remaining traces of the skin-loosening agent from the pulp bodies and said bodies then pass from the conveyor 12 down the chute 115 into whatever receptacle or conveyor is provided to receive them.

The pieces of skin adhering to the apron 82 are washed therefrom into the receptacle 112 by water from the nozzles 110.

It is to be understood that wherever the term "fruit" is employed, not in conjunction with the term "vegetables," the term "fruit" is used to indicate both fruit and vegetables. This is especially the case in the claims to avoid an alternative expression.

I claim:

1. In a machine for peeling fruit and vegetables, the combination of a conveyor, means to operate the conveyor, and means above the conveyor operating to make openings in the skins of the articles as they are being conveyed, said means also operating in conjunction with the conveyor to turn the articles.

2. In a machine for peeling fruit and vegetables, the combination of a foraminous apron, means to move said apron, means above the apron to make openings in the skins of the articles as they are carried by the apron, and water-spray means above the last named means.

3. In a peeling machine, the combination of a conveyor apron, means to operate said apron, a transverse series of independently pivoted fingers above the apron, and knives on the respective fingers.

Signed at Los Angeles, Cal. this 24th day of March, 1922.

HARRY M. MILLER.

Witnesses:
GEORGE H. HILES,
L. BELLE WEAVER.